G. L. C. COULON.
Weighing Scale.
No. 212,300. Patented Feb. 18, 1879.
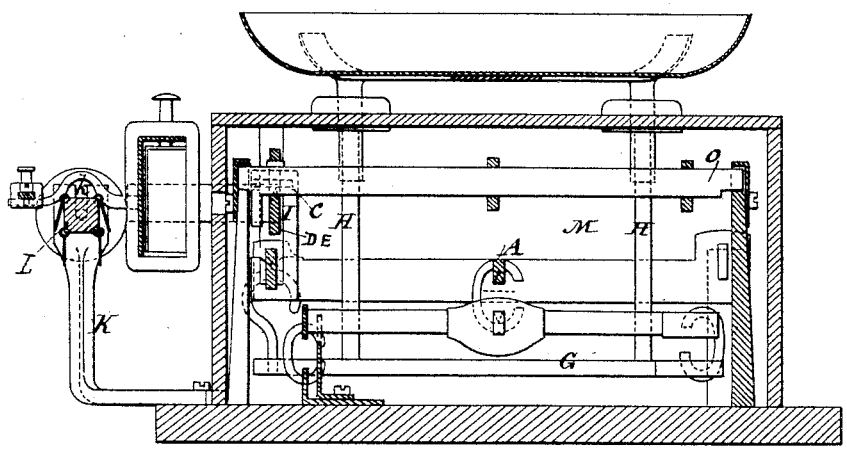
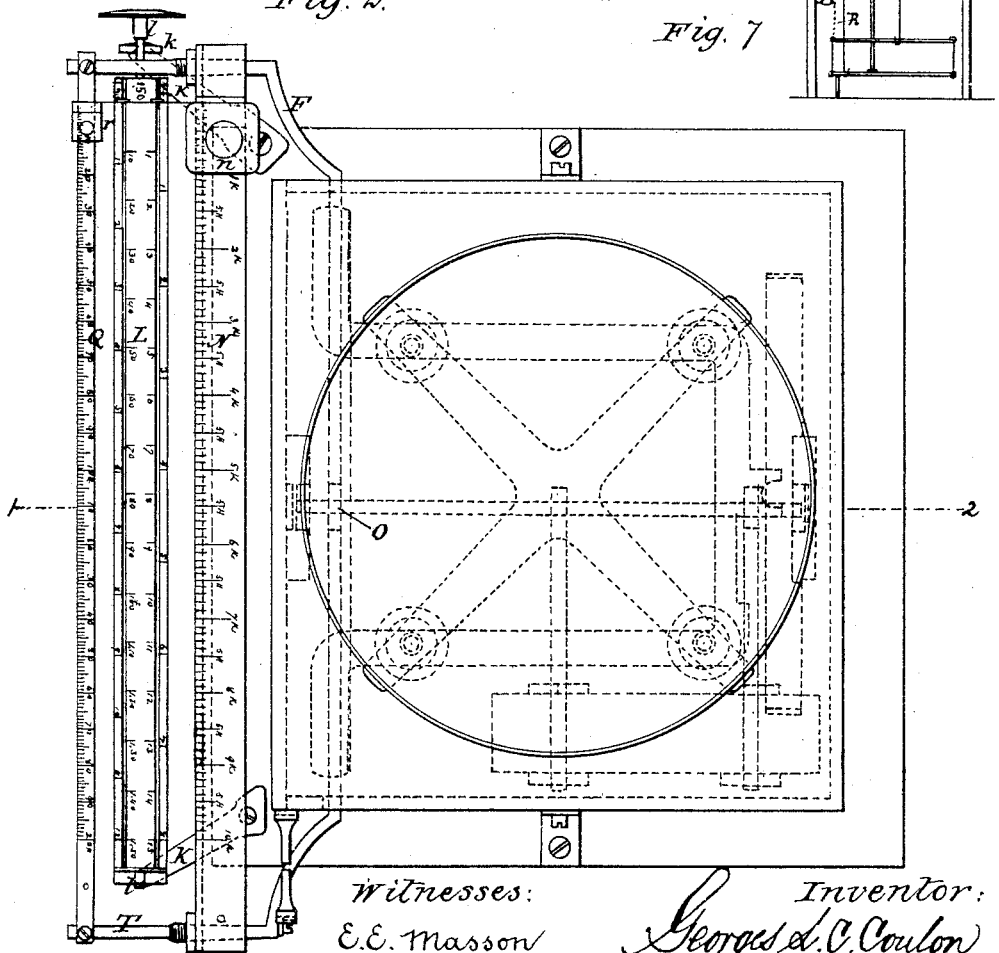

3 Sheets—Sheet 2.
G. L. C. COULON.
Weighing Scale.
No. 212,300. Patented Feb. 18, 1879.
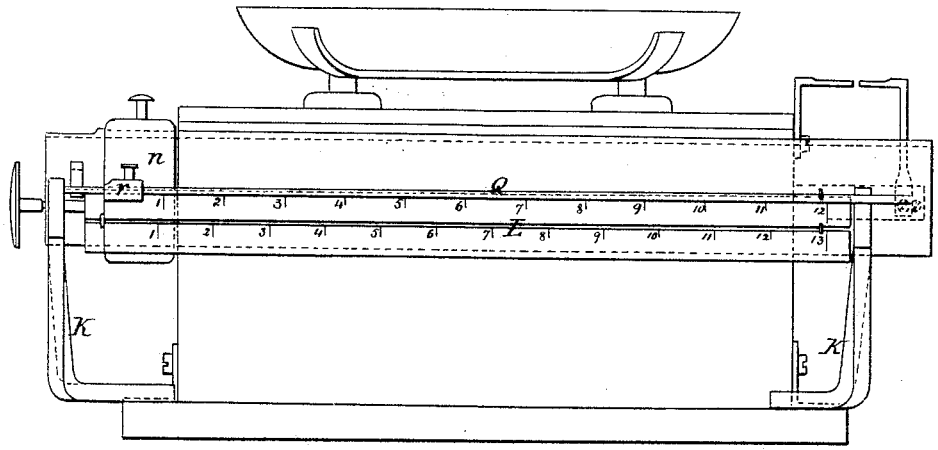
Fig. 3.
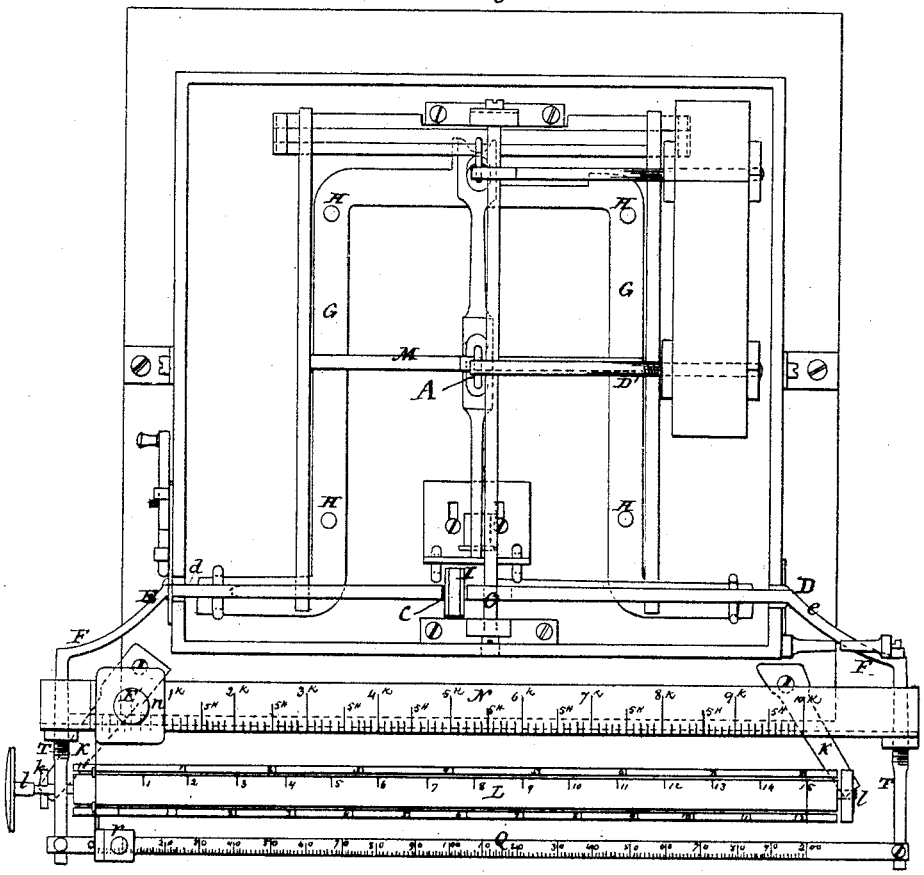
Fig. 4.
Fig. 8.
Witnesses:
E. E. Masson
Inventor
Georges L. C. Coulon
by A. Pollok
his attorney G. L. C. COULON.
Weighing Scale.

No. 212,300. Patented Feb. 18, 1879.

Witnesses:
E. E. Masson
Ec. H. Dick

Inventor:
Georges L. C. Coulon
by A. Pollok
his attorney.

UNITED STATES PATENT OFFICE.

GEORGES L. C. COULON, OF PARIS, FRANCE.

IMPROVEMENT IN WEIGHING-SCALES.

Specification forming part of Letters Patent No. 212,300, dated February 18, 1879; application filed December 11, 1878.

*To all whom it may concern:*

Be it known that I, GEORGES LOUIS CHARLES COULON, manufacturer, of Paris, in the Republic of France, have invented certain Improvements in Weighing-Machines, of which the following is a specification:

This invention relates to a kind of balances, to which I have given the name of "balances for weight and price," the object of which is to give the weight of merchandise, and also the whole price, in accordance with the unit of price or price of a single unit of weight.

The determinations of weight may be made by this invention according to any system of weights with a sensibility and exactness superior to those made with instruments now in use.

The apparatus may be made of all sizes, to weigh objects of from two hundred grams, and even less, to fifty kilograms in weight, and, if necessary, this limit may be passed.

The price is indicated on a price-scale, or scale the divisions of which represent money values, by a movable needle or pointer. The number or amount indicated by the pointer, when the balance is *in equilibrio*, is exactly that of the total price of the merchandise.

The weight is given, irrespective of the price-indications, by means of a combination of slides or movable weights and graduated arms, on the principle of a steelyard.

By the arrangement and combination of the fixed graduated plates or arms the weight and price are both ascertained by a double or independent movement of the slides without the use of ordinary weights, and without any calculation.

The utility and advantage to trade and commerce of the scales made in accordance with this invention, and their superiority to those now in use, are evident.

The mechanism employed to carry out this invention is very simple, and may be varied without departure from the spirit of the invention.

The apparatus consists, essentially, of devices for indicating the weight and price, combined with mechanism for producing equilibrium, composed of levers and their fulcrums or knife-edges, a plate or pan being provided, on which the material to be weighed is placed.

The following description, with reference to the accompanying drawings, will enable those skilled in the art to which it appertains to make and use my invention.

Figure 5:
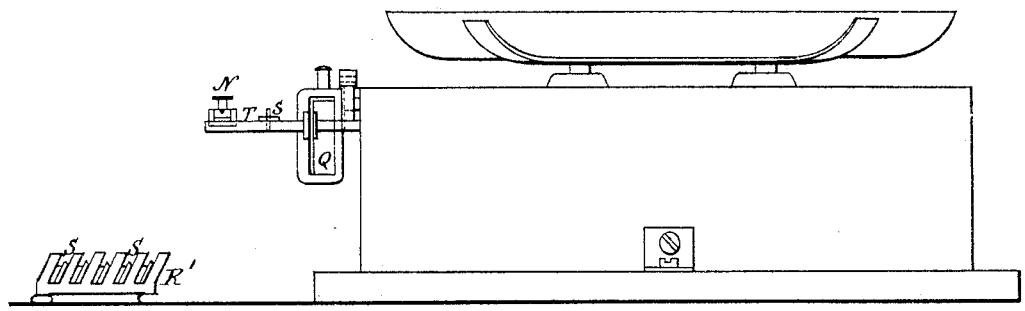

In the drawings, Figure 1 is a vertical section of the balance on line 1 2 of Fig. 2. Fig. 2 is a top-plan view; Fig. 3, a front elevation; and Fig. 4, a plan view, with the top portions of the apparatus removed to enable the mechanism to be seen. Fig. 5 is a side view of the balance, somewhat modified; and Fig. 6, a top view. Fig. 7 is a diagram, to illustrate the principle of the balance used; and Fig. 8, a view of the graduated arms, to be used for determining the weight and price.

Before describing the balance itself as used in trade, the principle on which it operates, by reference to the diagram, Fig. 7, will be explained.

The instrument in its simplest form may be considered as a rigid frame, of which one end is supported by knife-edges A, resting on bearing-surfaces, and the other describes, when put in motion by its own weight, an arc of a circle, having A as its center, and A B as its radius.

To retain the system in equilibrium a lever of the first class, C D, fulcrumed at O, is employed. The short arm of this lever supports, at C, by means of a connecting-link, the weight of the frame. The force exerted at B is transmitted to O without alteration. Let the part O D be made ten times as long as O C, and let the power be represented by P and the resistance by R. This will give the following proportion: P : R :: O D : O C.

Making the resistance R equal to 10 kilograms, the arm of the lever O C equal to 0.015 meter, and the long arm O D equal to 0.150 meter, we have the following proposition: 10 kilograms : P :: 0.150 meter : 0.015 meter. Seeking the value of P, we have: P = 10 kilograms × 0.015 ÷ 0.150 = 0.150 ÷ 0.150 = 1 kilogram.

If, now, we divide the long arm of the lever O D into one hundred equal parts, starting from the fulcrum, the distance between these divisions will be 0.0015 meter. A slide or movable weight of one kilogram placed at the first division will balance one hundred grams placed on the plate of the scales. When placed at the second division it will balance two hundred grams; at the fifth, five hundred grams; at the tenth, one kilogram; at the one-hundredth, ten kilograms. I have therefore applied to one-half of a balance of equilibrium a steelyard or lever, with arms having to each other, as to their length, a ratio of one to ten, the longer arm being graduated by hectograms from zero to ten kilograms, the distance between the divisions being 0.0015 meter.

Wishing to double the length of the graduated portion, to render the determination more exact and the reading easier, I have made a scale, Figs. 2 and 4, indicating the weight from zero to ten kilograms, in the following manner: Let C D, Fig. 4, be the horizontal projection of the steelyard, and O the point of support. We have, as in the preceding instance, the power P applied at D, and the resistance R applied at C. If the arm of the steelyard be prolonged so as to make O E = O D, and supposing, as before, O E = 0.150 meter, we would have O D + O E = 0.500 meter.

Fixing parallel to the prolonged steelyard D E, by means of branches F, a graduated arm divided into one hundred equal parts, with a distance between the divisions of 0.003 meter, we will have for the total length of the graduated portion twice the length of the long arm of the lever, or 0.150 meter × 2 = 0.300 meter.

The distance between the division will be then, for a hectogram 0.003 meter, for a kilogram 0.030 meter, and for five kilograms 0.150 meter.

Having made the fiftieth division—that is to say, the division which indicates the weight of five kilograms—coincide with the point of support of the lever, the one-hundredth division will coincide with the point E, and will be consequently 0.150 meter from the point O. The zero of the scale will also be at a distance of 0.150 meter from the fiftieth division—that is to say, opposite the point D.

If, now, we consider the slide or movable weight, the heaviness of which we have already determined, we know that it ought to weigh one kilogram, and that at a distance of 0.150 meter from the point of support it balances a weight of ten kilograms placed in the plate of the scales.

If we diminish the weight of the slide by one-half, and provide the mounting of the graduated arm with a counter-weight of five hundred grams fixed at the extremity D' of a lever 0.150 meter from the center of oscillation of the steelyard, so that the center of gravity of this mass is exactly in the plane of the knife-edges, the balance will be *in equilibrio* when the slide, which weighs also five hundred grams, is moved to the point E', so that the center of gravity of the movable mass passes exactly through this point, because there will be masses of equal weight placed at the extremities of arms of equal length.

The length of the lever-arm may be diminished and the weight of the fixed counterpoise proportionately increased with the same result, as is represented in the accompanying drawings.

When it is desired to determine weights of from one gram to two hundred grams, a graduated arm of the same length as the aforesaid lever, placed before it and arranged in the same way, is employed with a slide of ten grams in weight. The divisions of this graduated arm to the number of two hundred are made at intervals of 0.0015 meter, and indicate grams.

From the foregoing the operation of the balance shown in the drawings, which realizes in a perfect way the double indication of the weight and price of all merchandise, will be readily understood. It is composed of a simple mechanism, M, forming the half of a balance of equilibrium, the lower frame, G, of which is provided with four rods, H, having at their ends four little bent arms, which support the plate or pan P.

The vertical movement of the apparatus is transmitted by the connection or link I to the point C of the short arm of the lever, equal in length to the distance between this point and the point of oscillation O.

As before stated, the long arm D of the lever or steelyard is prolonged to an equal length on the other side of the fulcrum to the point E. The extremities $d$ and $e$ of this arm, bent outward, carry two shanks, T, on which is fixed the graduated rule or scale N, indicating the kilograms and hectograms, and, farther off, the rule or scale Q, indicating the grams. The system is connected and is put into oscillatory motion by the prolonged lever, to which it is joined.

Two branches at right angles, K, terminating in slotted heads, receive in the slots the journals $l$ of a prism, L, with a greater or less number of faces, each of which carries a scale giving the price of the merchandise which is to be weighed for every ten centimes according to a certain initial or unit of price.

The collection of scales of this class, the number of which it is understood is not limited, is according to the large number of initial prices; but they may be limited in number to the prices current which the articles usually have in commerce.

To avoid the necessity of a multiplicity of many-sided prisms, a single one with four sides, on which is exposed a series of scales on an endless band or ribbon, like the cards of the weavers, may be used instead.

To determine the price in weighing, the pointers of the slides or movable weights and the graduated scale are brought into contact with each other by a horizontal movement, and the division of the scale indicated by the pointers gives the total price of the merchandise weighed, according to its initial price.

The slide or weight $n$, movable on the large arm N, graduated for kilograms, shows the exact number without fraction of the kilograms or hectograms, and its pointer indicates on the price-scale the price corresponding to that portion of the weight. The fractions of the weight in grams are shown on the small graduated arm Q by the small slide $r$ of which the pointer indicates the corresponding fraction of the amount due on the price-scale.

Figure 6:
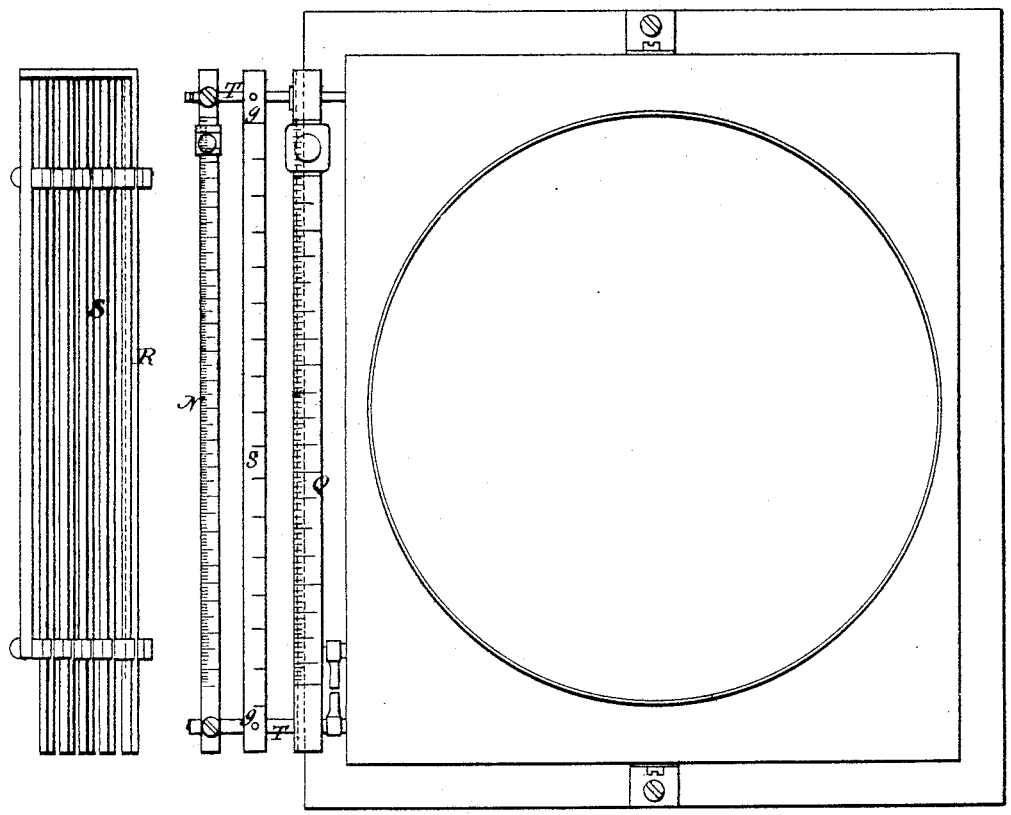

In case a large number of scales for different prices is necessary, I prefer to employ the arrangement represented in Figs. 5 and 6. All the scales are detachable and independent of one another. They are kept in a holder, separate from the balances. They are printed on both sides, and are disposed in such a way as to facilitate the choosing of any one needed for weighing.

The following is the mode of proceeding: From the scale-holder R', resembling an ordinary pen-holder, and having a greater or less number of divisions, according to the number of the price-scales, a suitable scale is chosen and placed between the two graduated arms N and Q on the two oscillating arms T, provided for this purpose with two little pins, $g$, which enter holes at the proper distance apart in the ruler to which the price-scale is attached. The price-scale oscillates with the graduated arms of the balance.

It will be seen that this combination and arrangement of parts of the balance permit it to be employed, first, as the ordinary balances for giving the weight from one gram to ten kilograms; second, as a balance for determining the weight and price, a series of scales divided by francs and centimes being added.

These price-scales are of the same length as the graduated arms of the balance. If we propose to find the weight and price on a balance of one kilogram, of which Fig. 8 represents the different scales or graduated plates, this is how to proceed:

Let it be supposed, for example, that the weight and corresponding price are to be ascertained of merchandise placed on the plate or pan of the balance which is to be sold at two francs the kilogram. If to balance the article weighed we bring the slide to the line of two hundred grams of the large graduated arm, and the little slide to the line forty-four of the small graduated arm, the sum of these two numbers will furnish us with the weight—viz., two hundred and forty-four grams.

Now, if we wish to know the corresponding price, and we see that the pointer of the large slide is opposite the number 0.40, and that the pointer of the small slide is between the numbers 8 and 9 of the same scale, which indicates more than eight centimes and less than nine, or eight centimes and a fraction, we know that the total value is forty-eight centimes and a fraction of a centime.

By calculation the following would have been obtained: 2 francs : 1,000 grams :: X : 244 grams, or $244 \times 2$ francs $\div 1,000 = 488 \div 1,000 = 0.488$ francs.

Proceeding in the same way for all the scales, we would have the weight to a gram and the price to a centime of merchandise placed upon the plate or pan of the balance. If we proceed now to weigh with a balance of ten kilograms, as shown in Figs. 1 to 6 of the drawings, we see that the large graduated arm, with a length of 0.300 meter, is divided into ten parts, each corresponding to one kilogram; that each of these parts is subdivided into ten smaller parts to give the hectograms; that the small graduated arm is divided into two parts to give two hectograms, and that each of these is subdivided into one hundred parts for the grams.

The price-scale shown in the drawings in position between the two graduated arms, is that used for goods having the price of 1.50 franc per kilogram. To balance the goods placed on the weighing plate or pan, it may happen that the large slide must be brought to a division of the graduated arm not opposite any division of the price-scale. Say, for example, the slide rests between the two divisions of the graduated arm, indicating, the one 2 kilograms 800, and the other 2 kilograms 900. To mark an exact number of kilograms, the slide is moved to the division indicating 2 kilograms 800, and then the small slide is moved to balance the goods—say, to the division indicating 49 grams. The total weight of the goods, is therefore, 2 kilograms 849 grams. What is done with regard to the graduated arms must be repeated almost always with the price-scale—that is to say, it is only rarely that the pointer of the large slide coincides with a division of the price-scale.

To obtain the price of the merchandise we proceed as before to obtain the weight. The slide or movable weight is brought opposite the division of the price-scale indicating 420 francs, and equilibrium is obtained by moving the small slide to a point indicating on the same scale seven centimes and a fraction. Thus the weight and price of the goods placed on the weighing plate or pan of the balance are obtained by means of a double operation, the one on the two graduated arms to obtain the weight, and the other on the price-scale for the total price of the goods.

I have described the invention as applied to a balance weighing by grams and kilograms, and determining the price in francs and centimes; but it is evident that the graduated arms may be divided into pounds and ounces, and that the price-scales may be divided into dollars and cents, or pounds, shillings, and pence; or the divisions may be in accordance with other systems of weights and values.

The weight and price indications may be employed with other systems of balances instead of the one described. The weight and price indications being in a measure independent, may, if deemed suitable, be used separately or one without the other.

The forms and dimensions of the apparatus may be varied according to the business in which it is to be used and the material to be weighed thereby.

Having thus described my said invention, what I claim, and desire to secure by Letters Patent, is—

1. The combination, in a balance or scales, of the weighing plate or pan in which the goods are placed, a lever or system of levers connected with two or more vibrating arms, with or without divisions or graduations thereon, and two or more slides or movable weights adjustable on said arms, with a price-scale having a double or larger number of series of divisions, indicating price, arranged relatively, as described, so that the position of each of the slides on the arms indicates the price or a portion of the price on the price-scale, substantially as set forth.

2. The combination, in balances or weighing-scales, with the weighing-plate and a series of levers connected therewith, of a centrally-pivoted lever, counterpoised on one side, and a pair of arms, provided with slides or movable weights, arranged to vibrate in connection with the centrally-pivoted lever, and a detachable or variable price-scale placed between the arms, substantially as set forth.

3. In a balance or weighing-scale, the combination of one or more oscillating arms, one or more slides or movable weights, with a suitable supporting-frame, provided with slotted branches or equivalent means to support a detachable scale or scales, substantially as described.

4. The combination, with a balance operating on the principle of the steelyard by means of two slides or movable weights, of a revoluble prism, having a number of faces, with a double series of price-indications on each of said faces, relatively arranged, as described, so that the position of the slides indicates the price of the article by means of the double series of price-indications upon one of the faces of the prism, substantially as set forth.

In testimony whereof I have signed my name to this specification in the presence of two subscribing witnesses.

GEORGES LOUIS CHARLES COULON.

Witnesses:
 ALFRED COINY,
 ROBT. M. HOOPER.